United States Patent [19]
Umemoto et al.

[11] Patent Number: 5,481,857
[45] Date of Patent: Jan. 9, 1996

[54] MOWER BLADE MOUNTING STRUCTURE

[75] Inventors: Hideya Umemoto; Hiroaki Kawakita; Kazuo Samejima; Mitsuhiro Matsuyama; Hideo Okura; Kaname Matsuzaki; Masaji Kure, all of Sakai, Japan

[73] Assignee: Kubota Corporation, Osaka, Japan

[21] Appl. No.: 223,503

[22] Filed: Apr. 4, 1994

[30] Foreign Application Priority Data

| Sep. 3, 1993 | [JP] | Japan | 5-219917 |
| Sep. 7, 1993 | [JP] | Japan | 5-221627 |
| Sep. 30, 1993 | [JP] | Japan | 5-244038 |

[51] Int. Cl.⁶ .......................... A01D 34/66; A01D 34/82; A01D 67/00
[52] U.S. Cl. .............. 56/12.6; 56/14.7; 56/15.8; 56/320.2
[58] Field of Search .................. 56/12.6, 14.7, 56/13.5, 15.8, 17.5, 320.1, 320.2

[56] References Cited

U.S. PATENT DOCUMENTS

| 2,523,640 | 9/1950 | Zipf | 56/320.1 |
| 3,056,249 | 10/1962 | Shaw | 56/12.6 |
| 3,654,750 | 4/1972 | van der Lely | 56/320.2 X |
| 3,901,003 | 8/1975 | Erdman | 56/12.6 |
| 4,008,556 | 2/1977 | Wegscheid et al. | 56/12.6 |
| 4,724,660 | 2/1988 | Bowie et al. | 56/320.1 X |

Primary Examiner—George A. Suchfield
Attorney, Agent, or Firm—Jordan and Hamburg

[57] ABSTRACT

A mower unit includes a plurality of blade mechanisms each having a blade and a blade shaft fixed to the blade for supporting the blade, pulleys and a belt for transmitting drive among the blade mechanisms, a plate-like support frame for interconnecting the blade mechanisms through intermediate members, a mower deck, and vibration proofing rubber elements disposed between the mower deck and the blade mechanisms.

19 Claims, 13 Drawing Sheets

MOWER BLADE MOUNTING STRUCTURE

BACKGROUND OF THE INVENTION

1. FIELD OF THE INVENTION

The present invention relates a mower blade mounting structure for attaching a plurality of blade shafts having grass cutting blades and pulleys to a mower deck, with a transmission belt wound around the pulleys.

2. DESCRIPTION OF THE RELATED ART

A conventional mower unit includes blades supported by support shafts, and blade shafts fixed to the support shafts and having bearings fixed to a mower deck. However, the mower deck tends to resonate with vibrations of a mower drive system to produce loud noise. Thus, this construction has room for improvement from the viewpoint of quietness.

SUMMARY OF THE INVENTION

An object of the present invention is to effectively suppress vibration of a mower deck due to a mower drive system to diminish noise to a satisfactory level without entailing faulty blade drive.

The above object is fulfilled, according to the present invention, by a mower unit comprising a plurality of blade mechanisms each having a blade and a blade shaft fixed to said blade for supporting said blade, drive transmitting means for transmitting drive among said blade mechanisms, rigid connecting means for interconnecting said blade mechanisms through intermediate members, a mower deck, and vibration proofing means disposed between said mower deck and said blade mechanisms.

According to the above construction, vibration proofing elastic elements are disposed between the blade shafts and mower deck. These elastic elements effectively suppress resonance of the mower deck with vibration of a mower driving system, to diminish noise produced by the mower deck.

Where the vibration proofing elastic elements are simply placed between the blade shafts and mower deck, the blade shafts could be displaced relative to one another due to deformation of the elastic elements. Then, a transmission belt wound around a plurality of pulleys could slip to cause faulty blade drive. In a preferred embodiment of the present invention, the plurality of blade shafts are rigidly interconnected through a rigid connecting member to maintain the blade shafts at fixed distances relative to one another. This construction is effective to avoid the faulty blade drive due to slippage of the transmission belt.

Thus, the present invention provides a mower unit which effectively suppresses noise of the mower deck due to vibration of a mower drive system to realize improved quietness while assuring reliable blade drive by a transmission belt.

Further and other objects, features and effects of the invention will become more apparent from the following more detailed description of the embodiments of the invention taken with reference to the accompanying drawings.

DETAILED DESCRIPTION OF THE PREFERRED EMBODIMENTS

A first embodiment of the present invention will be described hereinafter with reference to the drawings.

Figure 1:
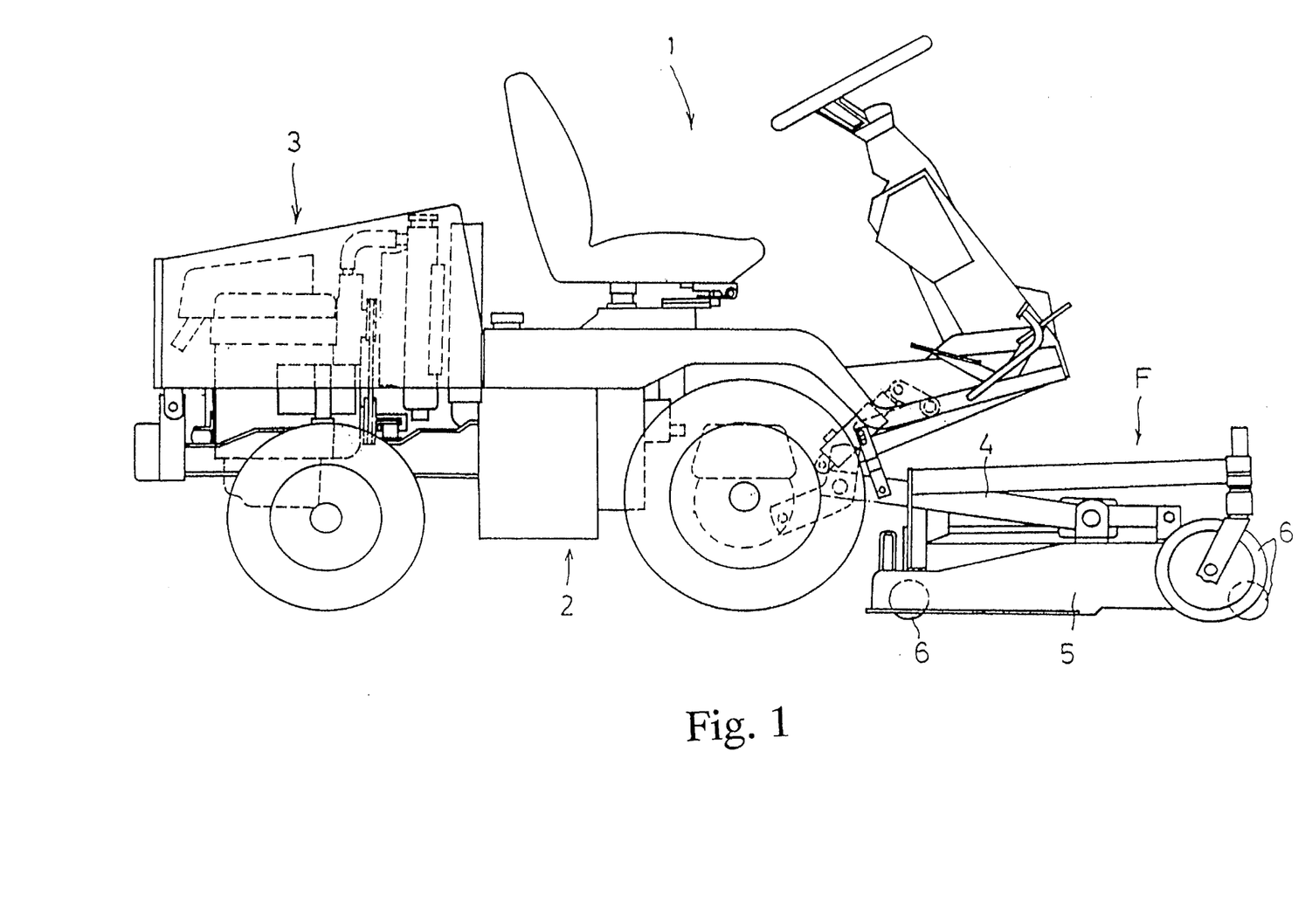
FIG. 1 is a side elevation of a lawn tractor including a mower unit having a blade mounting structure according to the present invention.

As shown in FIG. 1, a riding lawn tractor includes a driver's section 1 disposed in a front portion thereof, a propelling drive transmitting section 2 disposed in an intermediate to rearward portion, and a motor section 3 disposed in a rear portion. A front mower unit F is connected forwardly of the tractor.

Figure 2:
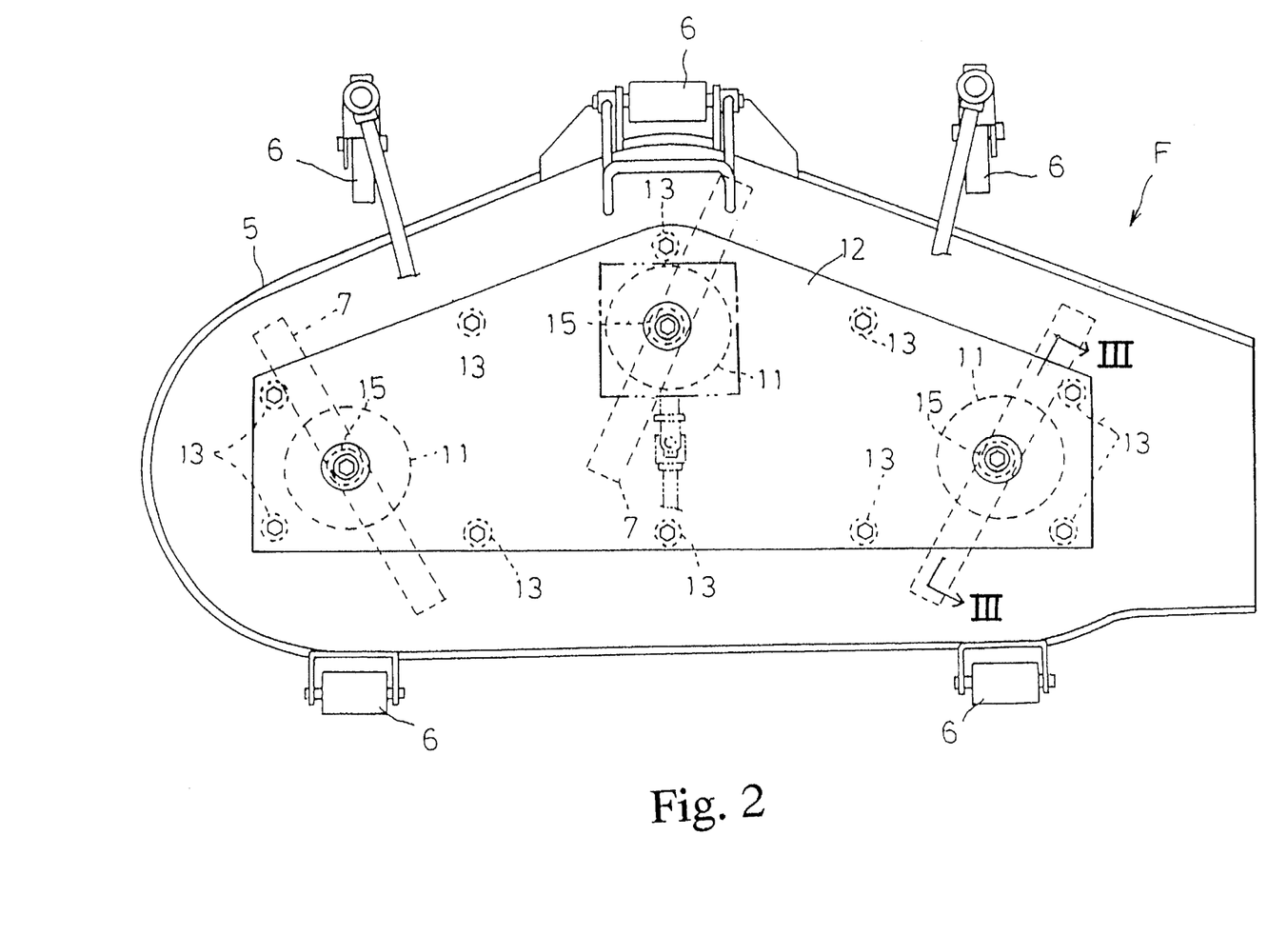
FIG. 2 is a plan view of the mower unit.

The front mower unit F includes a mower deck 5 connected through lift links 4 to a vehicle body. The mower deck 5 has ground wheels 6 arranged in front and rear and right and left positions, so that the front mower unit F is movable on the ground. As shown in FIG. 2, three blades 7 are arranged substantially transversely in an interior space of the mower deck 5.

Figure 3:
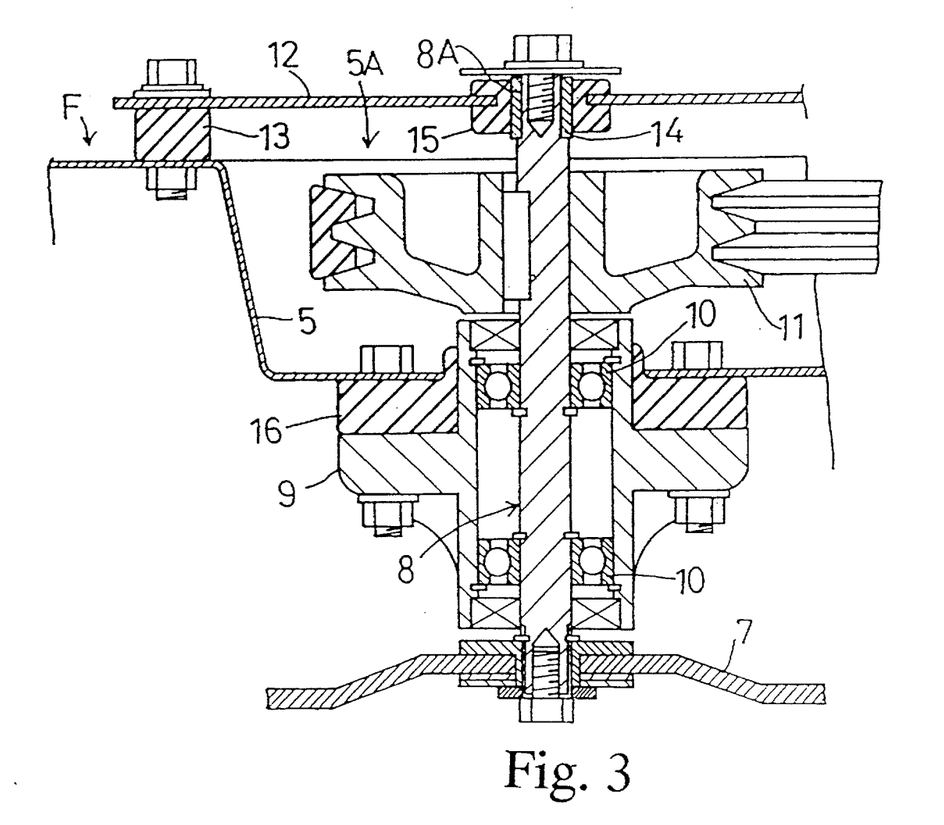
FIG. 3 is a section taken on line III—III of FIG. 2 showing a blade mounting structure in a first embodiment of the invention.

A blade support structure will be described in relation to one of the blades 7. As shown in FIG. 3, a supporting boss 9 is attached to a predetermined position in a downwardly opening recess 5A of the mower deck 5 through a rubber element 16 acting as a vibration proofing member. A vertical blade shaft 8 is rotatably supported in the supporting boss 9 through bearings 10. The blade 7 is fixed to a lower end of the blade shaft 8. A belt winding pulley 11 is fixed to an upper position of the blade shaft 8 projecting from the supporting boss 9. The pulley 11 and a belt for rotating the pulley 11 constitute a drive transmitting device.

Such supporting bosses 9 are disposed in a plurality of positions in the downwardly opening recess 5A. Pulleys 11 are attached to the blade shafts 8 supported by the supporting bosses 9, respectively. A transmission case 12 is attached to the mower deck 5 through vibration proofing rubber elements 13 to cover regions above the pulleys 11. Each blade shaft 8 extends upward through the pulley 11 and transmission case 12. The following mechanism is provided between an upper extension 8A of the blade shaft 8 and the transmission case 12. A bush 14 is fitted on the extension 8A. The bush 14 has a baked outer peripheral surface to which a vibration proofing rubber element 15 is attached. This rubber element 15 is attached also to the transmission case 12. This structure provides a vibration proofing support for the supporting boss 9 and avoids tilting of the blade shaft 8. This structure also closes a gap between the mower deck 5 and transmission case 12, and a gap between the blade shaft 8 and transmission case 12, to prevent entry of grass clippings and the like.

Figure 4:
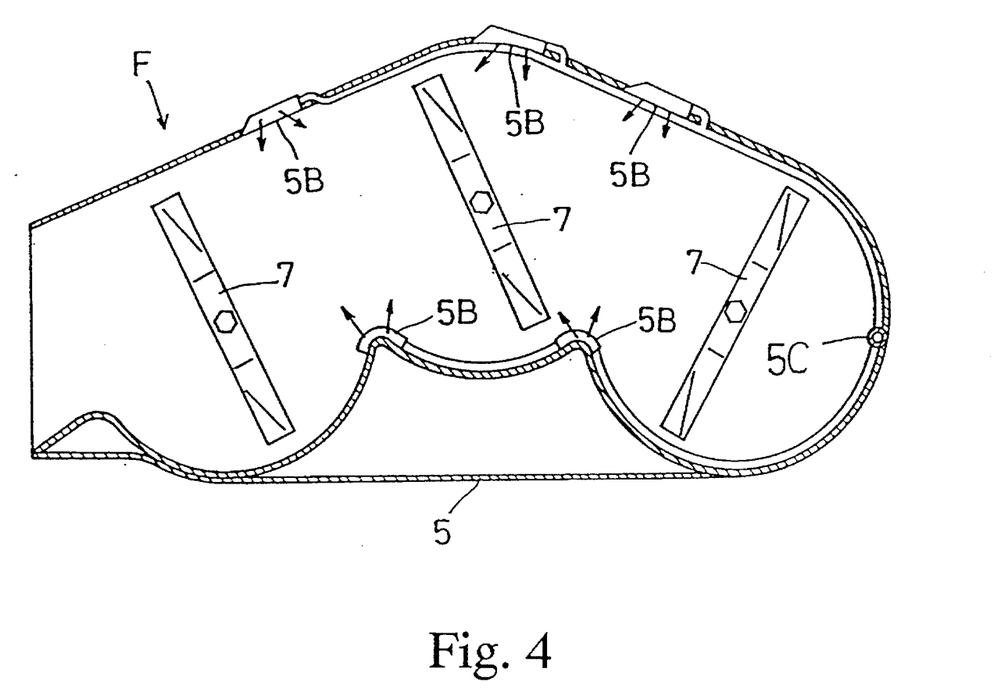
FIG. 4 is a sectional view showing interior of a mower deck.
Figure 5:
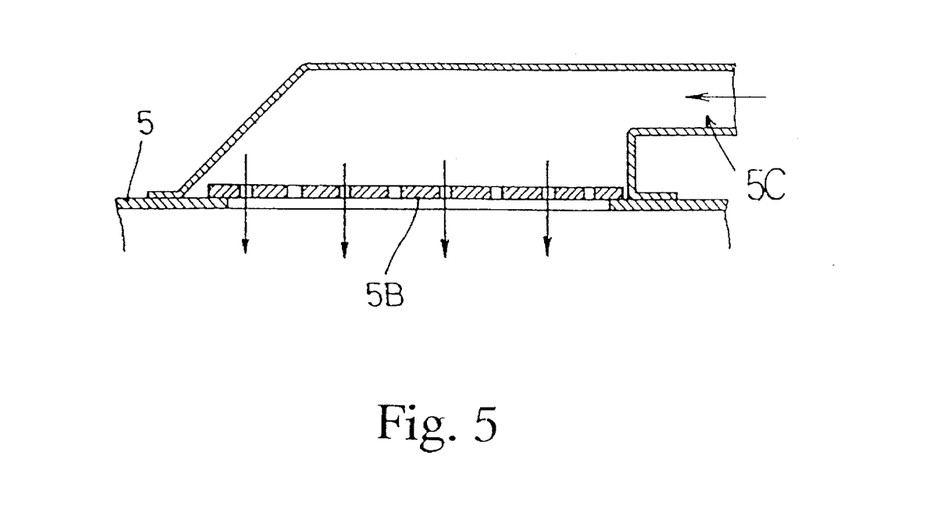
FIG. 5 is a sectional plan view of a mechanism for preventing grass clippings from adhering to the mower deck.

As shown in FIGS. 4 and 5, the mower deck 5 includes inner walls 5B formed of perforated metal and applied to portions of an outer peripheral wall. Passages are formed between the inner walls 5B and outer wall to jet out compressed air or water through the inner walls 5B to scatter grass clippings or the like adhering to portions of the mower unit. Reference 5C in the drawings denotes an inlet of the air or the like. The vibration proofing elements for supporting the transmission case 12 may be disposed either between the transmission case 12 and blade shafts 8 or between the transmission case 12 and mower deck 5. This type of mower unit is applicable to a walking operator type lawn mower as well as a riding lawn tractor.

A second embodiment of the present invention will be described with reference to FIGS. 6 through 11.

Figure 6:
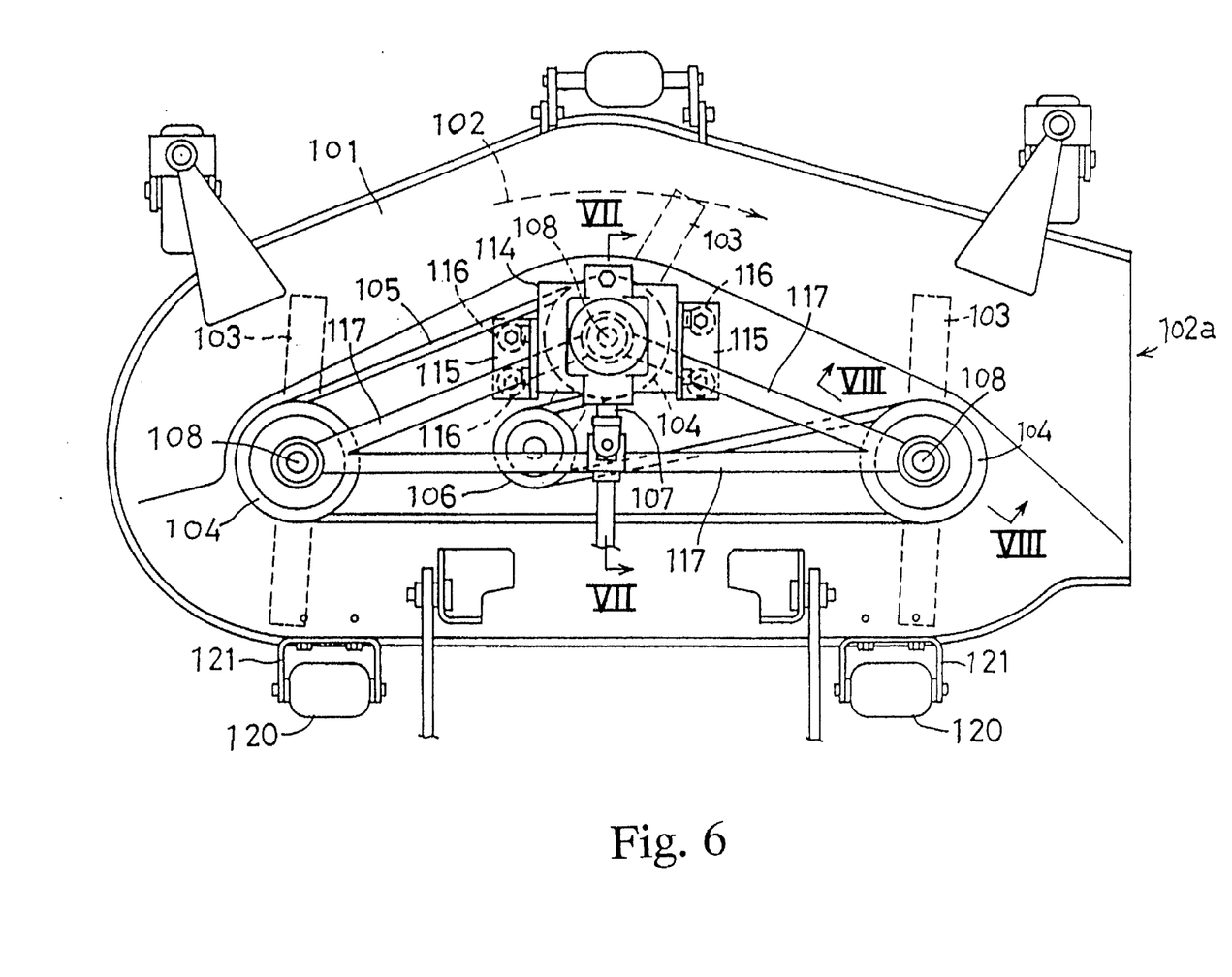
FIG. 6 is a view of an important portion of the mower unit showing a blade mounting structure in a second embodiment of the invention.

As shown in FIG. 6, a downwardly opening mower deck 101 has three grass cutting blades 103 arranged along a grass discharge passage 102. The blades 103 are attached to lower ends of three blade shafts 108 having pulleys 104 attached to upper positions thereof, respectively. A transmission belt 105 is wound around the three pulleys 104, with a tension pulley 106 acting on the transmission belt 105. The middle blade 103 is interlocked to an input shaft 107 to which drive is transmitted from a PTO shaft of a tractor, for example. Thus, the blades 103 are rotatable to cut grass and discharge grass clippings outwardly of the mower deck 101 through an outlet 102a at one end of the grass discharge passage 102.

Figure 7:
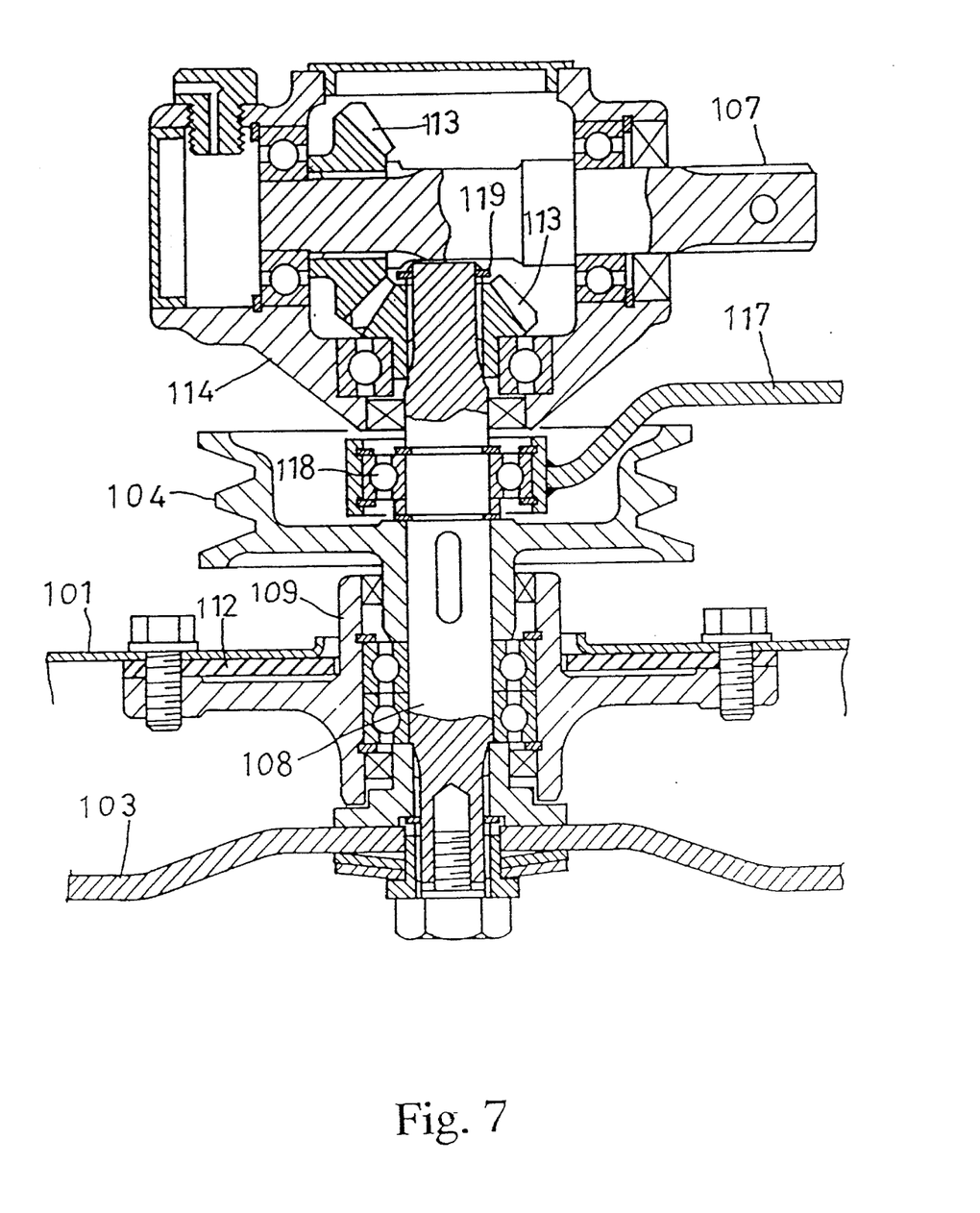
FIG. 7 is a section taken on line VII—VII of FIG. 6.

As shown in FIG. 7, the blade shaft 108 supporting the middle blade 103 has a bearing bracket 109 attached to the mower deck 101 through a vibration proofing rubber element 112. This suppresses noise due to resonance of the mower deck 101 with vibration of a mower drive system.

Figure 17:
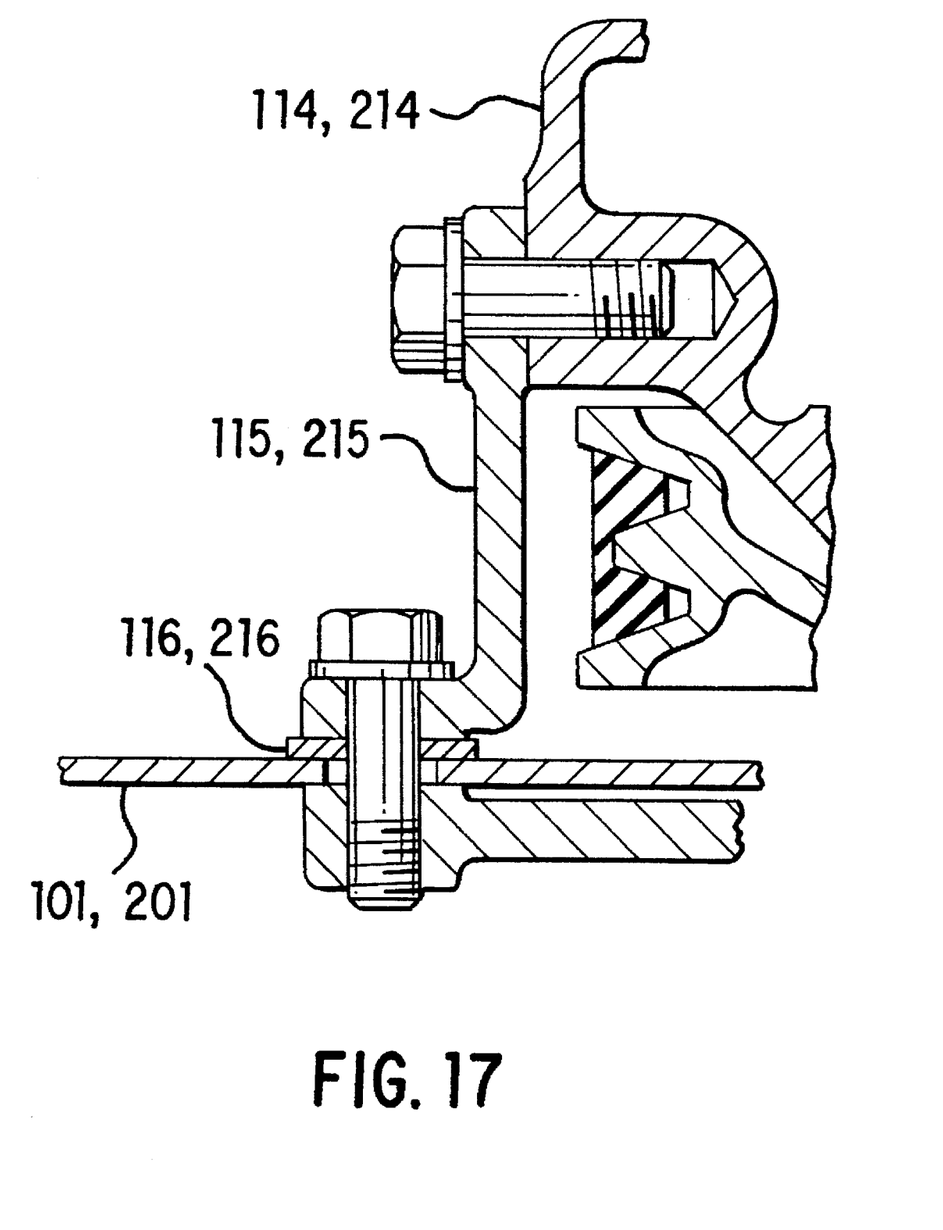
FIG. 17 is a fragmentary section view depicting the manner of attaching a drive components incasing structure to the mover deck.

The input shaft 107 and blade shaft 108 are interlocked through bevel gears 113 mounted in a case 114. The case 114 is attached to the mower deck 101 through brackets 115 and vibration proofing rubber elements 116 in manner as shown in FIG. 17. One of the bevel gears 113 is attached to the blade shaft 108, with a gap provided between the bevel gear 113 and a retainer clip 119, to allow vertical relative movement between the blade shaft 108 and bevel gear 113. This gap accommodates vertical relative movement between the blade shaft 108 and bevel gear 113 due to the vibration proofing rubber elements 112 and 116.

Figure 8:
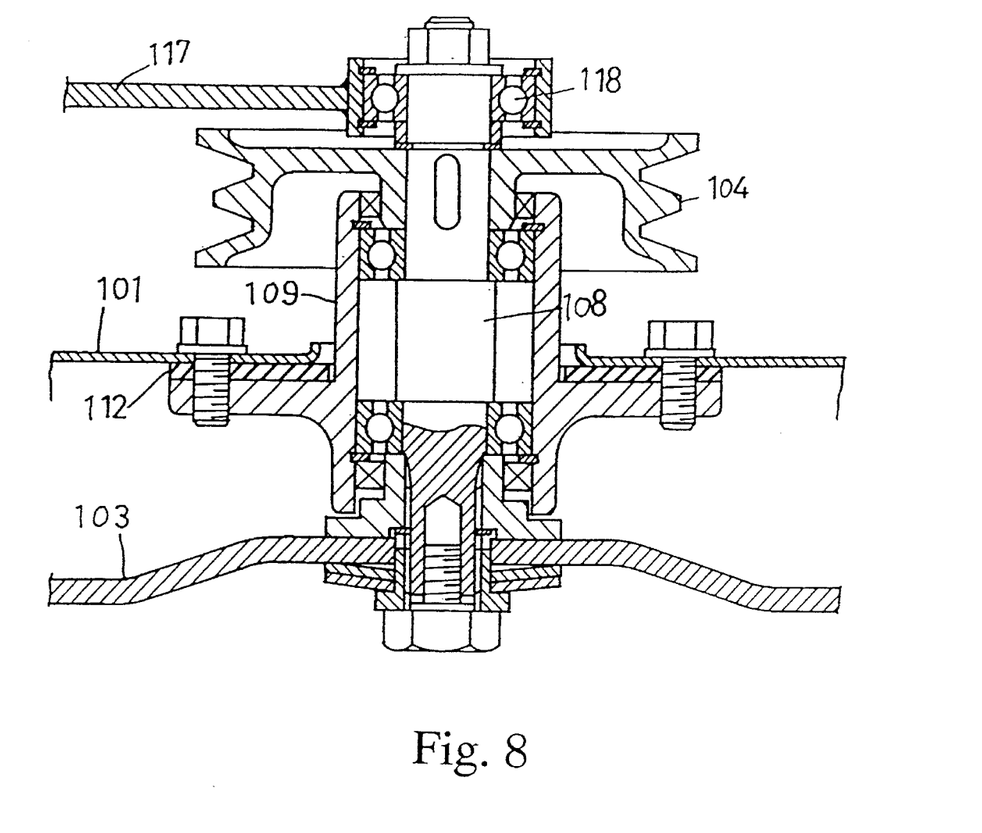
FIG. 8 is a section taken on line VIII—VIII of FIG. 6.

As shown in FIG. 8, the blade shaft 108 supporting the right or left blade 103 has a bearing bracket 109 attached to the mower deck 101 through a vibration proofing rubber element 112. This suppresses noise due to resonance of the mower deck 101 with vibration of the mower drive system.

Figure 9:
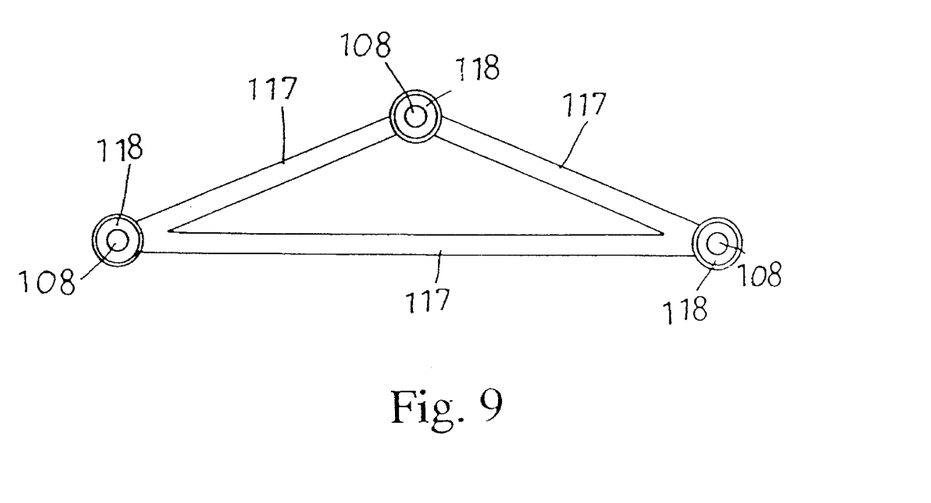
FIG. 9 is a front view of a support frame acting as rigid connecting means.

As shown in FIGS. 7 through 9, the three blade shafts 108 are interconnected through a rigid connecting frame 117, with a bearing 118 mounted between each blade shaft 108 and rigid connecting frame 117. In FIG. 9, for example, the rigid frame 117 is shown having an isosceles triangle configuration. Thus, the three blade shafts 108 have fixed distances among themselves, while avoiding faulty drive of the blades 103 due to slippage of the transmission belt 105 despite deformation of the vibration proofing rubber elements 112.

Figure 10:
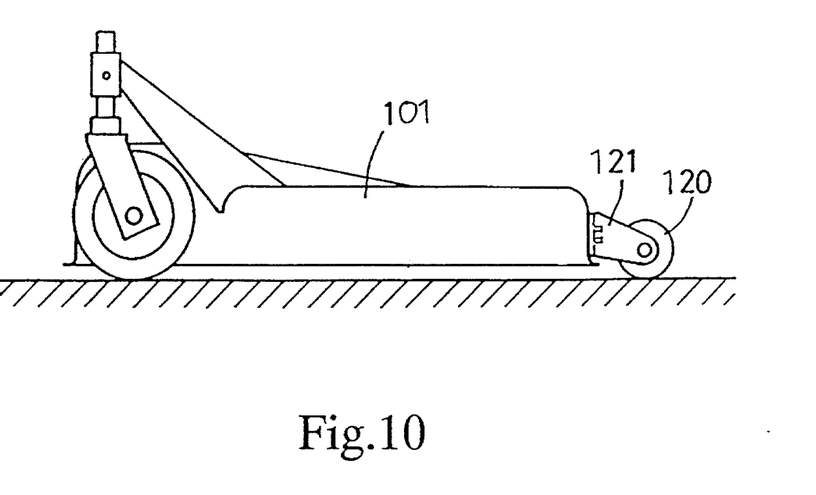
FIG. 10 is a side view of the mower unit in an operative position.
Figure 11:
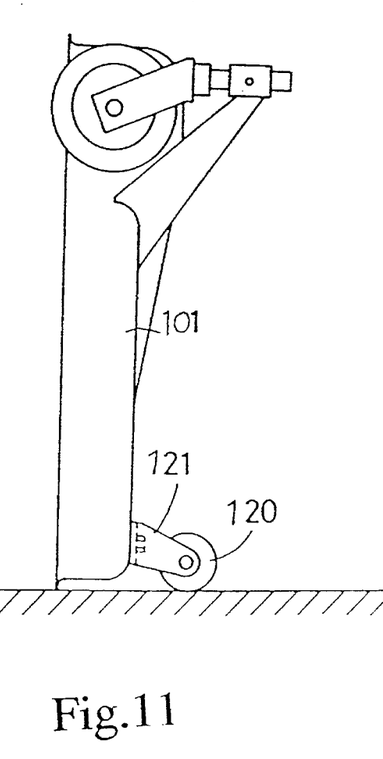
FIG. 11 is a side view of the mower unit in a position for storage.

As shown in FIGS. 10 and 11, the mower deck 101 includes a pair of right and left free rotation rollers 120 attached to rear positions thereof to override obstacles on the ground with ease. The rollers 120 are switchable between a use position and a contained position by reversing or turning roller supporting stays 121. Thus, the mower deck 101 detached from the tractor may be stored in a narrow space as standing steadily with support provided by the free rotation rollers 120.

A third embodiment of the present invention will be described with reference to FIGS. 12 through 16.

Figure 12:
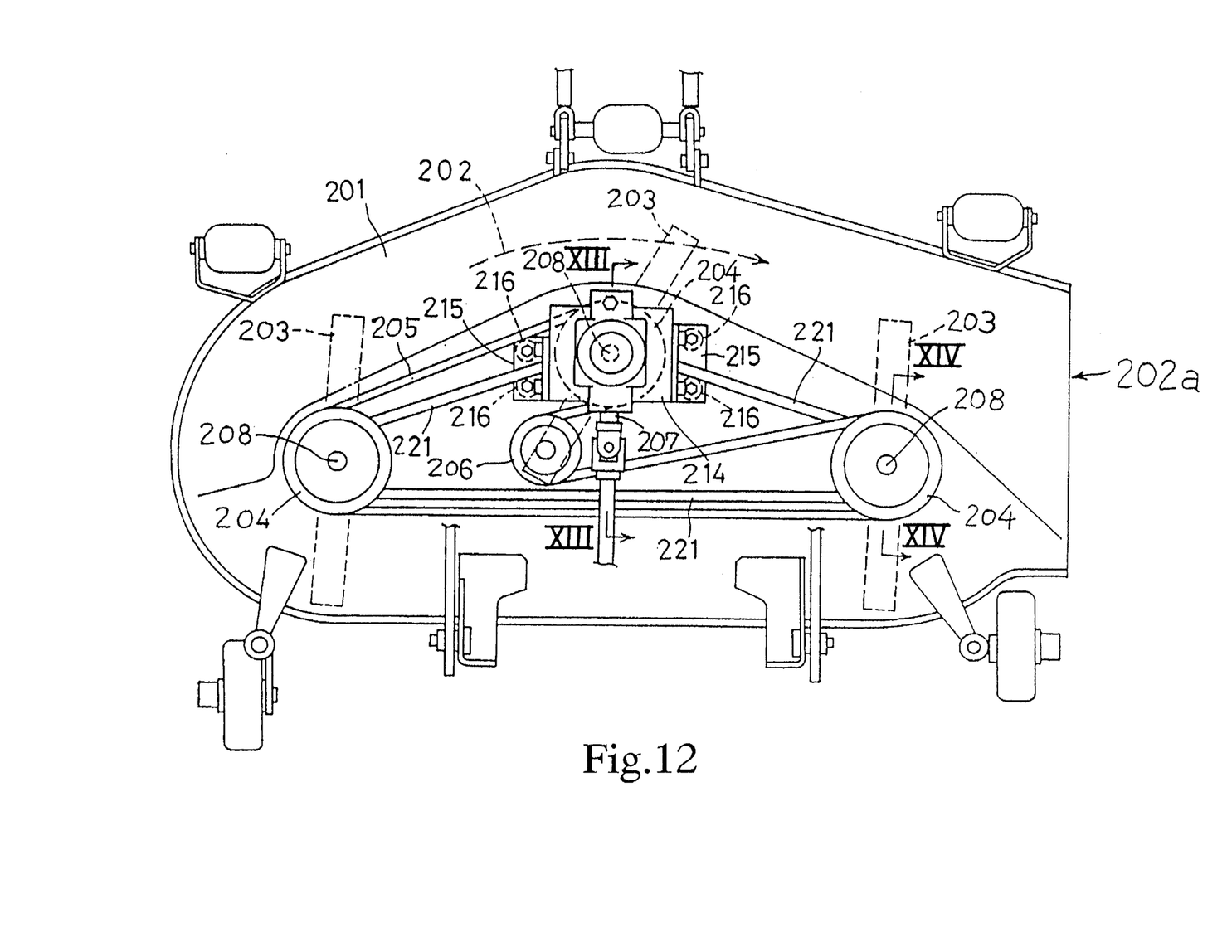
FIG. 12 is a view of an important portion of the mower unit showing a blade mounting structure in a third embodiment of the invention.

As shown in FIG. 12, a downwardly opening mower deck 201 has three grass cutting blades 203 arranged along a grass discharge passage 202. The blades 203 are attached to lower ends of three blade shafts 208 having pulleys 204 attached to upper positions thereof, respectively. A transmission belt 205 is wound around the three pulleys 204, with a tension pulley 206 acting on the transmission belt 205. The middle blade 203 is interlocked to an input shaft 207 to which drive is transmitted from a PTO shaft of a tractor, for example. Thus, the blades 203 are rotatable to cut grass and discharge grass clippings outwardly of the mower deck 201 through an outlet 202a at one end of the grass discharge passage 202.

Figure 13:
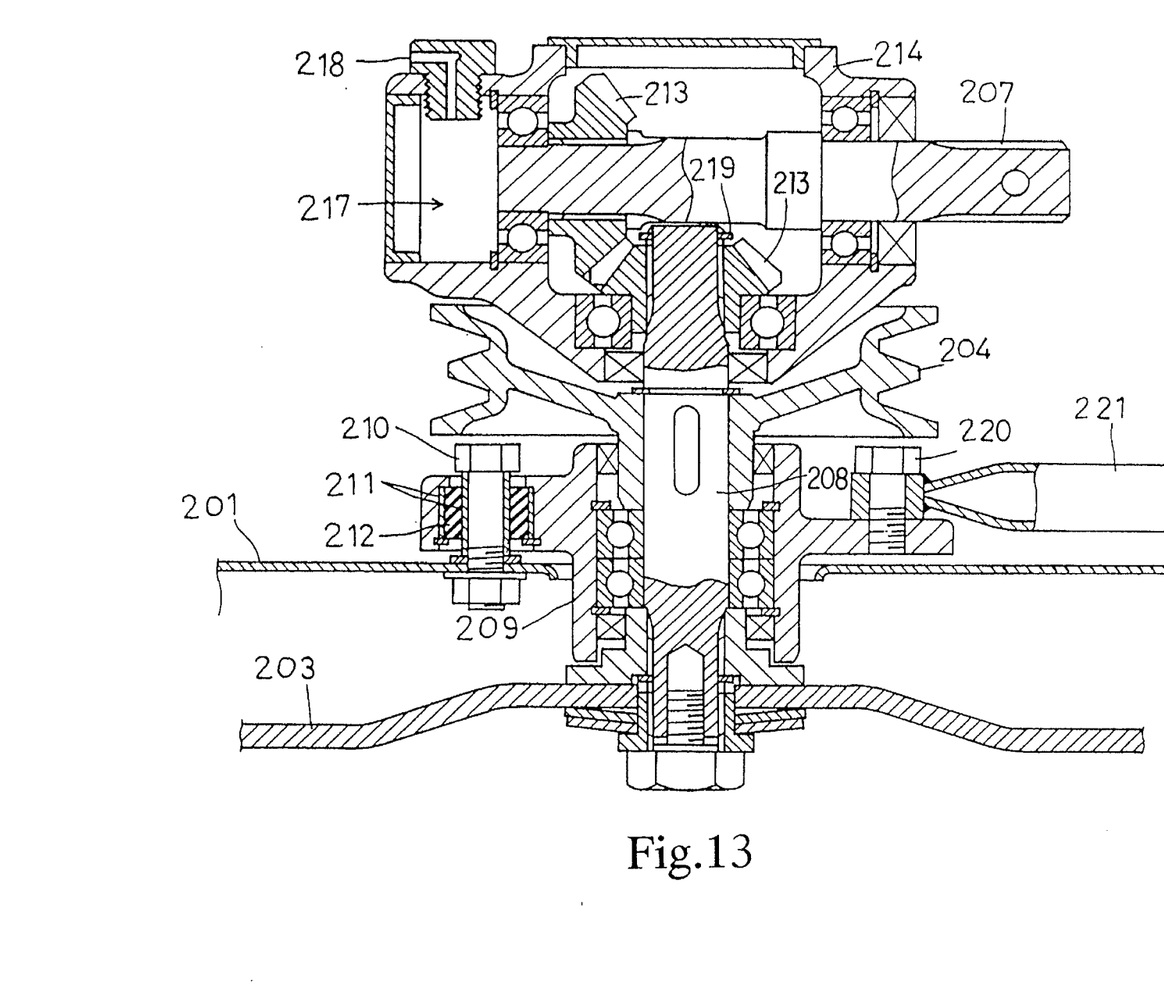
FIG. 13 is a section taken on line XIII—XIII of FIG. 12.

As shown in FIG. 13, the blade shaft 208 supporting the middle blade 203 has a bearing bracket 209 connected through a vibration proofing rubber element 212 to a bolt 210 secured to the mower deck 201. The rubber element 212 is attached by baking between inner and outer metal collars 211. This suppresses noise due to resonance of the mower deck 201 with vibration of a mower drive system.

The input shaft 207 and blade shaft 208 am interlocked through bevel gears 213 mounted in a case 214. The case 214 is attached to the mower deck 201 through brackets 215 and vibration proofing rubber elements 216, this mounting arrangement being seen, e.g., in FIG 17. The case 214 has a lower portion lying in a recess defined in the pulley 204, so that the case 214 has a reduced height. This case 214 is the oil bath type defining an air/oil separating chamber 217 having a breather 218 attached to an upper position thereof. One of the bevel gears 21 3 is attached to the blade shaft 208, with a gap provided between the bevel gear 213 and a retainer clip 219, to allow vertical relative movement between the blade shaft 208 and bevel gear 213. This gap accommodates vertical relative movement between the blade shaft 208 and bevel gear 213 due to vibration proofing rubber elements 212 and 216.

Figure 14:
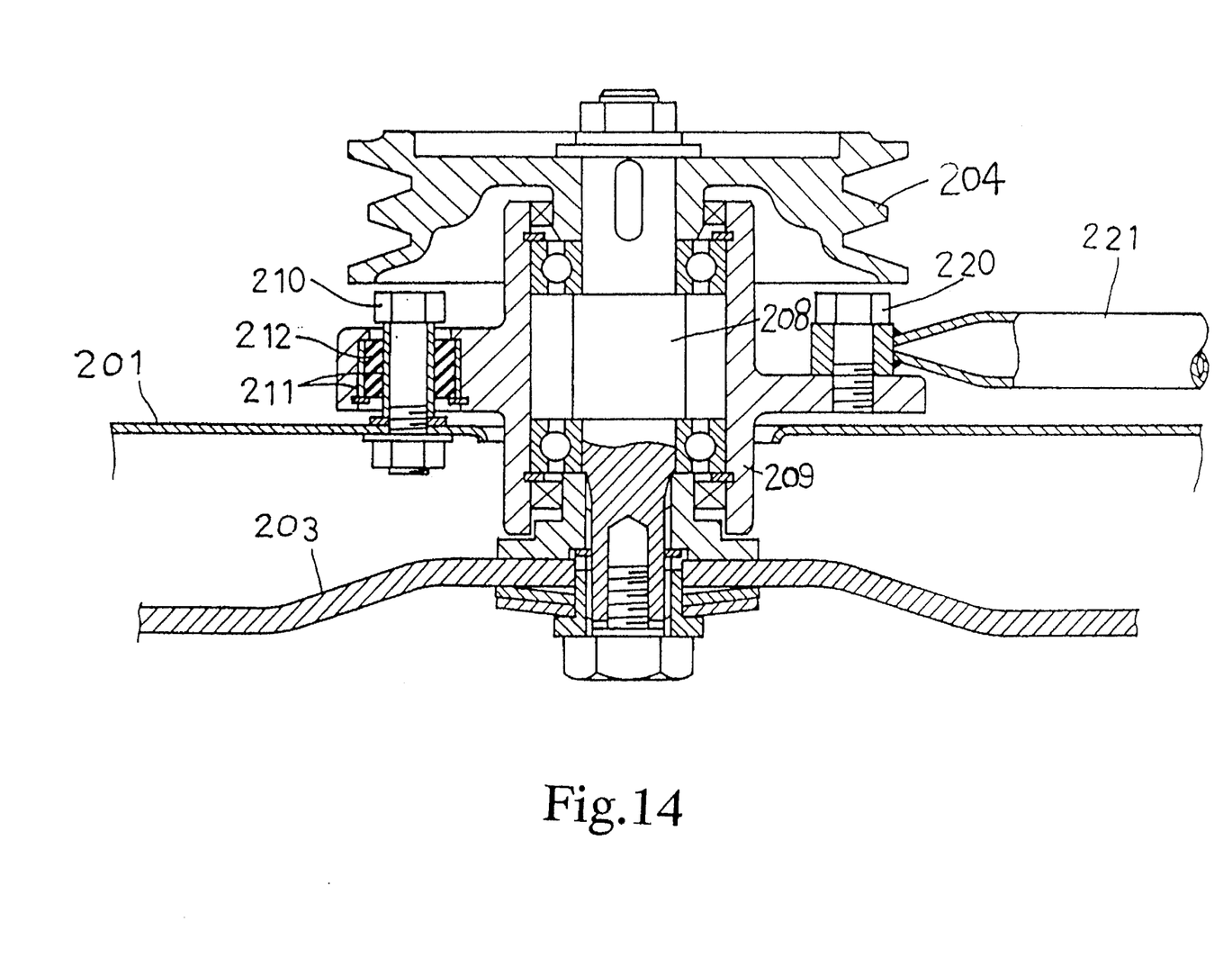
FIG. 14 is a section taken on line XIV—XIV of FIG. 12.

As shown in FIG. 14, the blade shaft 208 supporting the right or left blade 203 has a bearing bracket 209 connected through a vibration proofing rubber element 212 to a bolt 210 secured to the mower deck 201. The rubber element 212 is attached by baking between inner and outer metal collars 211. This suppresses noise due to resonance of the mower deck 201 with vibration of the mower drive system.

Figure 15:
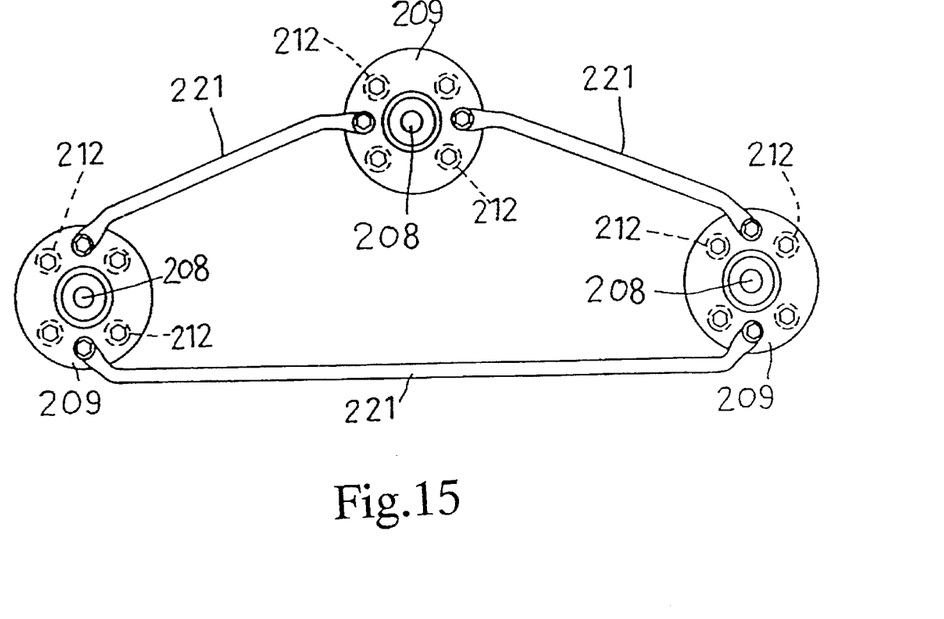
FIG. 15 is a front view of a support frame acting as rigid connecting means.
Figure 16:
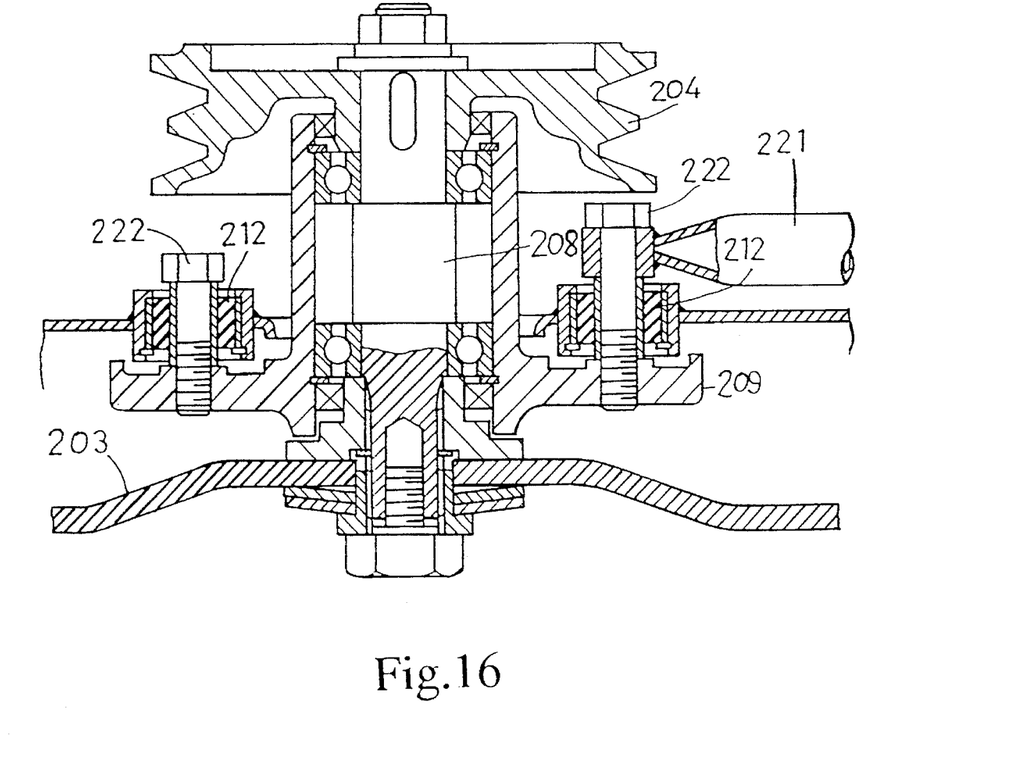
FIG. 16 is a section taken on line D—D' of FIG. 12 showing a blade mounting structure in a further embodiment of the invention.

As shown in FIG. 15, the three bearing brackets 209 are interconnected through three rods 221 securely attached thereto by bolts 220. Thus, the three blade shafts 208 have fixed distances among themselves, while avoiding faulty drive of the blades 203 due to slippage of the transmission belt 205 despite deformation of the vibration proofing rubber elements 212. These rods 221 have sufficient strength to act as a frame though the rods are in the form of hollow pipes and are lightweight.

While this embodiment includes three blades 203, the number of blades is optional. Further, as seen from FIG. 16, a vibration proofing rubber element 212 may be mounted between the mower deck 201 and each bolt 222 secured to the bearing bracket 209.

What is claimed is:

1. A mower unit comprising:
   a plurality of blade mechanisms each having a blade and a blade shaft fixed to said blade for supporting said blade;
   drive transmitting means for transmitting drive among said blade mechanisms;
   rigid connecting means for interconnecting said blade mechanisms through intermediate members;
   a mower deck mounting and housing said blade mechanisms; and
   vibration proofing means disposed between said mower deck and said blade mechanisms; and
   said intermediate members being bearings.

2. A mower unit as defined in claim 1, wherein said vibration proofing means comprises elastic elements.

3. A mower unit as defined in claim 2, wherein said elastic elements are formed of robber.

4. A mower unit as defined in claim 1, wherein said drive transmitting means includes pulleys mounted on said blade mechanisms, respectively, and a transmission belt interconnecting said pulleys.

5. A mower unit as defined in claim 4, wherein said connecting means essentially comprises a plate member covering upper surfaces of said pulleys.

6. A mower unit as defined in claim 1, wherein one of said blade mechanisms includes a bevel gear mechanism for receiving drive from a drive source of said mower unit, said bevel gear mechanism including bevel gears attached to said blade shaft and to an input shaft extending substantially perpendicular to said blade shaft.

7. A mower unit as defined in claim 5, wherein said rubber is substantially plate-shaped.

8. A mower unit as defined in claim 3, wherein said rubber is substantially ring-shaped.

9. A mower unit as defined in claim 1, wherein said mower deck is attached to said blade shafts through said vibration proofing means and bearings and at a location between said drive transmitting means and said blades.

10. A mower unit as defined in claim 9, wherein said connecting means is disposed above said drive transmitting means.

11. A mower unit as defined in claim 9, wherein said connecting means is disposed between said drive transmitting means and said mower deck.

12. A mower unit comprising:
    a plurality of blade mechanisms each having a blade and a blade shaft fixed to said blade for supporting said blade;
    drive transmitting means for transmitting drive among said blade mechanisms;
    rigid connecting means for interconnecting said blade mechanisms through intermediate members;
    a mower deck mounting and housing said blade mechanisms; and
    vibration proofing means disposed between said mower deck and said blade mechanisms; and
    said intermediate members being vibration proofing elastic elements.

13. A mower unit comprising:
    a plurality of blade mechanisms each having a blade and a blade shaft fixed to said blade for supporting said blade;
    drive transmitting means for transmitting drive among said blade mechanisms;
    rigid connecting means for interconnecting said blade mechanisms through intermediate members;
    a mower deck mounting and housing said blade mechanisms; and
    vibration proofing means disposed between said mower deck and said blade mechanisms, said connecting means including metal rods for maintaining said blade mechanisms at substantially fixed distances relative to one another.

14. A mower unit as defined in claim 13, wherein said rods are are arranged to present a plan profile of an isosceles triangle, and connected to said blade shafts through bearings.

15. A mower unit comprising: a plurality of blade mechanisms each having a blade and a blade shaft fixed to said blade for supporting said blade;
    drive transmitting means for transmitting drive among said blade mechanisms;
    a mower deck mounting and housing said blade mechanism;
    rigid connecting means for interconnecting said blade mechanisms and substantially covering an upper surface of said drive transmitting means and supporting said blade mechanisms said rigid connecting means maintaining said blade mechanisms at substantially fixed distances relative to one another; and
    first vibration proofing means disposed in at least one of a position between said connecting means and said blade shafts and a position between said connecting means and said mower deck, and second vibration proofing means between said mower deck and said blade mechanisms.

16. A mower unit as defined in claim 15, wherein said vibration proofing means comprises elastic elements.

17. A mower unit as defined in claim 16, wherein said elastic elements are formed of rubber.

18. A mower unit as defined in claim 15, wherein said drive transmitting means includes pulleys mounted on said blade mechanisms, respectively, and a transmission belt interconnecting said pulleys.

19. A mower unit as defined in claim 15, wherein said mower deck is attached to said blade shafts through said vibration proofing means and bearings and in a position below said drive transmitting means.

* * * * *